Dec. 14, 1926.
P. D. HARVEY
AUTO BUMPER
Filed Sept. 2, 1926
1,610,516
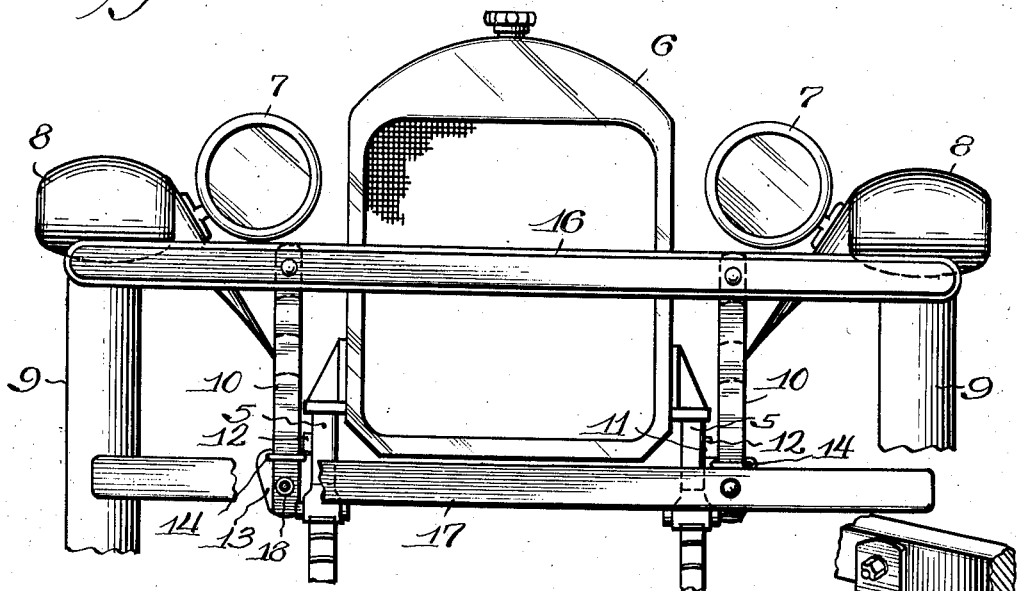
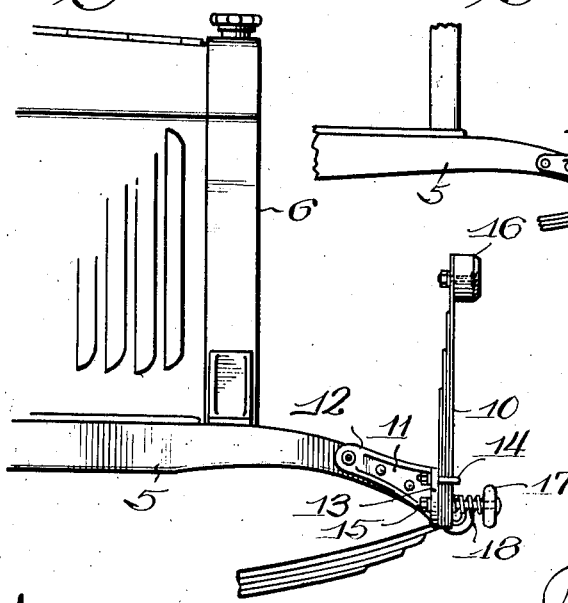
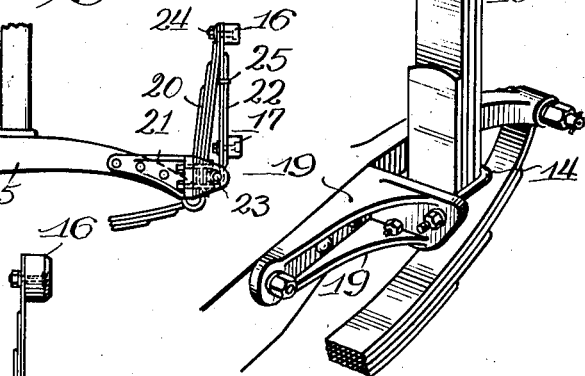
Inventor,
Paul D. Harvey
By Wm. O. Belt, Atty.
Witness:
Chas. R. Koursh.

Patented Dec. 14, 1926.

1,610,516

UNITED STATES PATENT OFFICE.

PAUL D. HARVEY, OF CHICAGO, ILLINOIS.

AUTO BUMPER.

Application filed September 2, 1926. Serial No. 133,151.

This invention relates to bumpers for automobiles and other motor vehicles, and its object is to provide a novel bumper of strong and substantial but simple construction which can be easily applied and which will protect the radiator, the lamps, the fenders and other parts of the vehicle from damage by collision and also protect persons against injury.

In the accompanying drawings I have illustrated a selected embodiment of the invention and referring thereto:

Fig. 1 is a front elevation of an automobile having my invention applied thereto.

Fig. 2 is a side elevation of the front end of an automobile frame with the bumper applied thereto.

Fig. 3 is a perspective view showing a modification of the invention.

Fig. 4 is a side elevation showing another embodiment of the invention.

Referring to the drawings 5 is the frame, 6 the radiator, 7 the lamps, 8 the front fenders and 9 the front wheels of an automobile. The bumper comprises two quarter elliptic springs 10 fastened to brackets 11 which are bolted to the sides of the frame 5 at the front end thereof. I have shown each spring 10 comprising four plates or leaves but the spring may be made heavier by the use of more plates or lighter by the use of fewer plates as desired. The bracket comprises a plate 12 which is shaped to fit against the side of the frame and is securely bolted thereto, and also a laterally projecting plate 13 to which the spring 10 is fastened by a clip 14 and a bolt 15. The two springs 10 project uprightly from the sides of the frame at the front ends thereof and a cross bar 16 is fastened to the upper ends thereof. This cross bar is located higher upon the automobile than is customary with bumpers now in general use and it is so positioned to better protect the automobile and pedestrians. It is arranged about midway of the height of the radiator, close to the lamps and in front of the front end portions of the front fenders so that it will form an efficient protection for these parts against damage by collision. The bar is also located at a height which I believe to be most desirable as a protection to pedestrians against injury in event they are struck by the automobile.

I may also provide a second bar 17 carried by the bolts 15 at the lower ends of the springs, (Fig. 2). These bolts are lengthened for this purpose and coil springs 18 are arranged on the bolts between the bar 17 and the springs 10 to form a cushion for the bar 17.

I prefer to position the brackets at the front ends of the sides of the frame, but it may be desirable on some motor vehicles to locate the brackets back of the front ends of the frame, as shown in Fig. 3, which also shows that the two plates 12, 13 of the bracket are connected by reenforcing and strengthening webs 19, 19 at the top and bottom.

The springs 10 are strong and substantial but sufficiently yielding to provide an efficient protection for the automobile against damage by collision; and also an efficient protection for pedestrians against injury from the automobile. The bumper can be manufactured at relatively low cost, it can be easily applied to motor vehicles of many different varieties and it can be easily replaced or repaired whenever required. With the exception of the brackets all the parts are stock parts and do not require to be specially made, and the brackets are simple castings which can be made in the form shown or in other suitable forms. I have used wood bars 16, 17 with satisfactory results, but I may use metal bars whenever it is desired. In Fig. 4 I have shown another embodiment of the invention in which the bar 16 is supported by springs 20 which are fastened by brackets 21 to the front end of the frame 5 and the lower bar 17 is carried by springs 22 which are supported by bolts 23 in the brackets 21. The upper ends of the springs 22 are also engaged with the bolts 24 which fasten the bar 16 to the springs 20. I have shown the spring 20 made of four leaves bent slightly outwardly, and the spring 22 made of two leaves substantially flat, and I may provide the spring 22 with a clip 25. This construction is strong and substantial and more rigid than the construction shown in Figs. 2 and 3.

While the invention is capable of being applied to many different types of motor vehicles it may be desirable and sometimes necessary to change the construction and arrangement of parts to better suit the invention for different vehicles, or for other reasons, and I reserve the right to make all such changes as fall within the scope of the following claims.

I claim:

1. The combination with the frame of a motor vehicle, of brackets fastened to the sides of the frame, quarter elliptic springs fastened at their lower ends to said brackets and projecting uprightly in front of the vehicle, and a cross bar fastened to the upper ends of said springs.

2. The combination with the frame of a motor vehicle, of brackets each comprising two plates, one plate being arranged alongside the side of the frame, means fastening said plate to the frame, the other plate extending outwardly from the frame and at a right angle thereto, quarter elliptic springs fastened at their lower ends to said other plates and projecting uprightly in front of the vehicle, and a cross bar fastened to the upper ends of said springs.

3. The combination with the frame of a motor vehicle, of brackets fastened to the sides of the frame, quarter elliptic springs fastened at their lower ends to said brackets and projecting uprightly in front of the vehicle, a cross bar fastened to the upper ends of said springs, elongated bolts projecting through the brackets and the lower ends of the elliptic springs, a cross bar carried by said bolts, and coil springs arranged on the bolts between said last mentioned cross bar and the elliptic springs.

PAUL D. HARVEY.